Oct. 22, 1968 R. C. SNARE 3,407,397

TERNARY MEMORY SYSTEM EMPLOYING MAGNETIC WIRE MEMORY ELEMENTS

Filed May 25, 1965 2 Sheets-Sheet 1

INVENTOR
R. C. SNARE
BY
William H. Kamstra
ATTORNEY

TERNARY MEMORY SYSTEM EMPLOYING MAGNETIC WIRE MEMORY ELEMENTS

Filed May 25, 1965

United States Patent Office 3,407,397

Patented Oct. 22, 1968

3,407,397

TERNARY MEMORY SYSTEM EMPLOYING MAGNETIC WIRE MEMORY ELEMENTS

Ronald C. Snare, Columbus, Ohio, assignor to Bell Telephone Laboratories, Incorporated, New York, N.Y., a corporation of New York Filed May 25, 1965, Ser. No. 458,623

19 Claims. (Cl. 340—174)

Figures 1, 5:
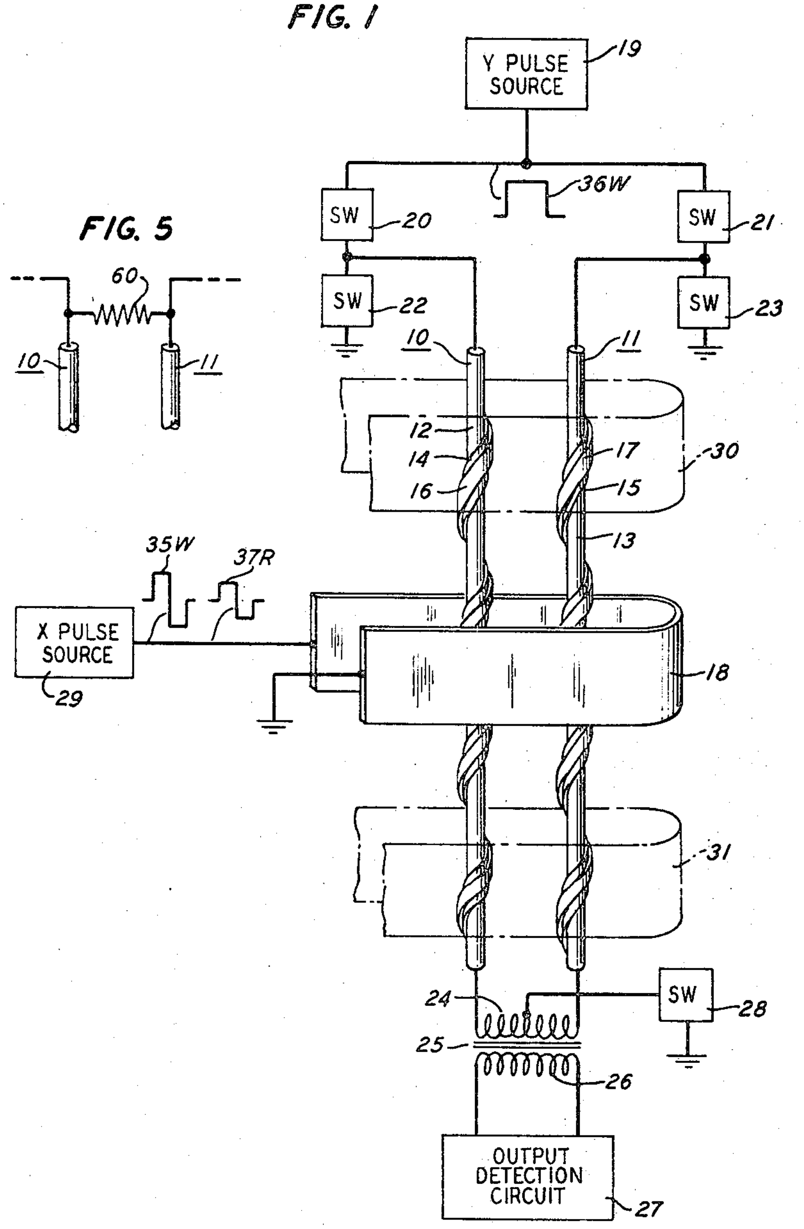

This invention relates to magnetic memory systems, and particularly to such systems adapted for the storage of ternary information.

Data processing systems designed to handle information based on the binary system of numbering are well known in the art as is their contribution to the present day revolution in virtually every technology. The use of computers in an ever-widening range of scientific and commercial applications, however, has demonstrated certain limitations inherent in systems operating in a radix two number system. The demands on a computer in terms of the volume of information to be processed, for example, has increased to a point which exceeds the data handling capability per time unit that is available in a binary system. A binary computer also fails to make the most efficient use of the recent advances in other arts such as that of solid state devices. Further, a binary based computer is less economical from the viewpoint of available information storage capacity than systems based on other numbering radices. To improve the rate at which a computer can process data, two courses are open. One course, which is beyond the scope of this invention, is to increase the operation speed of the computer circuits. Such an increase would at best be one of degree and would certainly add critical margins to the computer circuitry. Another course, and one which is contemplated in accordance with the principles of this invention, is to increase the volume of data processed per unit time. This may be accomplished without a corresponding increase in processing circuitry by increasing the data or information bearing capacity of the basic coding to which the data or information is reduced for handling by the computer. The use of higher base numbering systems achieves just such an increase in capacity.

Obviously, one digit in a radix ten system contains more information than a bit in a radix two system, and it might thus be assumed that the higher the number base employed, the more efficiently a computer is able to process data. Technological and economic considerations, however, offset the advantages of using a radix ten number system. For example, to discriminate among ten voltage levels with a reasonable degree of reliability would require large voltage differences and elaborate circuitry which would add considerably to the complexity and cost of the computer. It may also be demonstrated mathematically that the radix ten and, for that matter, the radix two number systems are not the most efficient systems on which to base the operations of a computer.

The number of semiconductor devices, S, required, for example, in a radix $b$ system of $n$ integers is directly proportional to the number base $b$ and the number of integers, $n$, represented $$S \propto nb$$

or in equation form $$S=knb \qquad (1)$$

where $k$ is the constant of proportionality. The maximum number, $L$, that may be expressed in this system is $$L=b^n \qquad (2)$$

The objective is to minimize the number of devices, S, required for any given number, L. Expressing Equation 2 in logarithmic form $$\ln L=n \ln b$$

$$n=\frac{\ln L}{\ln b} \qquad (3)$$

Substituting Equation 1 into Equation 3 gives $$S=f(b)$$

for any given number, L, and $$S=\frac{kb \ln L}{\ln b} \qquad (4)$$

If S has a critical value then $$\frac{dS}{db}=\frac{k(\ln L)(\ln b)-kb \ln L\left(\frac{1}{b}\right)}{(\ln b)^2}=0$$

and $$\ln L(\ln b-1)=0$$

If $1<L<\infty$ then $$\ln b=1$$

and $$b=\epsilon=2.718\ldots$$

is the critical value of $f(b)$.

To classify the critical value of $f(b)$ as a relative maximum or a relative minimum, the second derivative of S with respect to $b$ must be found and its sign determined at the critical value, $b=2.718$. Thus $$\frac{d^2S}{db}=\frac{k\ln L\,[(\ln b)^2-2\ln b+2]}{b(\ln b)^4}$$

evaluated at $b=2.718$ then $$\frac{d^2S}{db^2}=\frac{k \ln L}{2.718}$$

Since $k$ is a constant of proportionality and $1<L<\infty$, then $$\frac{d^2S}{db^2}>0$$

and the critical value, $b=2.718\ldots$, is a relative minimum. The number base epsilon is thus the most efficient number base for a computer from the viewpoint of minimizing the number of devices, S, and thereby for maximimizing the volume of data handled per a given number of devices. Although the nearest integer to epsilon is the integer three, the proximity of three is not sufficient, however, to guarantee that the radix three is the best choice over the radix two. $S=f(b)$ must be examined near the critical value, $\epsilon$. Recalling Equation 4, let $$K=k \ln L$$

then $$S=K\frac{b}{\ln b}$$

The values of S are calculated and tabulated in the following table which provides a comparison of the economy of various radices:

| b | ln b | b/ln b=S/K |
|---|---|---|
| 1 | .0 | ∞ |
| 2 | .694 | 2.88 |
| e | 1.00 | 2.718 |
| 3 | 1.10 | 2.73 |
| 4 | 1.39 | 2.88 |
| 5 | 1.61 | 3.10 |
| 6 | 1.79 | 3.35 |
| 7 | 1.95 | 3.59 |
| 8 | 2.08 | 3.84 |
| 9 | 2.20 | 4.09 |
| 10 | 2.30 | 4.35 |

From the foregoing analysis, it is manifest that the integer three is the optimum choice of a number base for the operation of information handling systems. Following the choice of a number base, the question is then presented of providing the necessary circuitry for carrying out the various and numerous operations of the system.

One of the most critical components of any data processing system is its memory and a wide variety for performing specific information storage functions are known in the art. In particular, magnetic memory arrangements which store binary information in the form of representative remanent states in magnetic core elements have achieved wide acceptance in the computer field. Magnetic wire memory elements, segments of which are adapted to perform the functions of conventional toroidal cores, have also been advantageously employed as basic information storage elements. One such magnetic wire memory element achieves the highly important goal of nondestructive readout while at the same time permitting an electrical change of the store information. In the patent of W. A. Barrett, Jr., No. 3,067,408, of Dec. 4, 1962, for example, is described such an element which comprises an electrical conductor having two magnetic tapes helically wound therearound. Each of the tapes is formed of a magnetic material having substantially rectangular hysteresis characteristics but one of the tapes has a higher coercive force than the other. When an information-representative remanent magnetic state is induced in a segment of the higher coercive force tape, the field of the magnetization induces a secondary magnetization in the opposite direction in the lower coercive force tape. The information is interrogated by applying a sensing drive to the latter tape of sufficient amplitude to cause a flux switching in that tape without disturbing the primary magnetization in the higher coercive force tape. Voltage signals induced in the conductor responsive to this flux switching are detected as indicative of the information state of the address segment thus described. Upon the termination of the interrogation, the overriding magnetic field of the primary magnetization restores the secondary magnetization in the lower coercive force tape without the application of an external rewrite drive. A highly advantageous memory element is thus realized and its adaptation for the storage of binary information is readily envisioned by one skilled in the art.

It is an object of the present invention to provide a new and improved magnetic memory arrangement capable of storing information based on the radix three numbering system.

Another object of this invention is to increase the information capacity of a magnetic memory without a corresponding increase in circuit elements.

A further object of this invention is a new and novel ternary information storage circuit from which the stored information may be read nondestructively.

The foregoing and other objects of this invention are realized in one specific illustrative memory in which each information storage cell comprises two segments of a pair of magnetic wire memory elements of the character described in the aforecited patent of Barrett. The memory elements each comprises an electrical conductor having two substantially square-loop magnetic tapes helically wound therearound; one tape, of a relatively high coercive force, is wound directly on the conductor, with the other tape, of a relatively low coercive force, being wound immediately on the first tape. Address segments are defined on two parallelly arranged wire elements by a conductor in the form of a strip solenoid inductively coupled thereto. Ternary information is introduced in a storage cell comprising the two address segments by coincident current pulses applied to the solenoid and to the two memory element conductors in particular directions as determined by the magnetic states to be established in the tape segments.

In accordance with one feature of this invention, for two of the representative magnetic states of the address tape segments, the two conductors of the memory wires are connected in series and for the other representative magnetic state the two conductors are connected in parallel. For two of the ternary characters, a pulse is applied to the end of one or the other of the serially connected conductors coincidently with a bipolar pulse applied to the solenoid. Since the conductors are serially connected, the oppositely poled pulses in the conductors are reversed for these ternary characters and magnetic states of opposite polarity are induced in each case in the high coercive force tape segments. For the remaining character, a pulse is applied to the ends of the conductors, which are now connected in parallel, coincidently with a bipolar pulse applied to the solenoid. Because the write fields operate in the same directions for the two memory wires in this case, magnetic states in the same direction are induced in the high coercive force tape segments. The three magnetic states of an address cell are thus advantageously representative of the ternary characters "0," "1," and "2." The fields of the magnetizations in the high coercive force tapes in each case induce secondary magnetizations in the lower coercive force tapes. During readout, the latter magnetic states are sensed to determine the character of the stored information.

A ternary information storage cell according to the principles of this invention is read out by applying a readout current pulse to the solenoid alone. This pulse is of sufficient amplitude to switch the secondary magnetization of the low coercive force tapes of the address segments but insufficient to cause a flux switching in the higher coercive force tapes. The summation voltage signals generated in the two conductors of the storage circuit by the flux changes in the lower coercive force tape are indicative of the particular ternary character stored in the circuit. In the specific storage circuit being generally described, three summation output signals are possible: a resultant positive signal which in indicative of the storage of a ternary "0," an effective zero signal which is indicative of a ternary "1," and a negative signal which is indicative of the storage of a ternary "2." Upon the termination of the readout operation, the flux states of the lower coercive force tapes of the memory elements again come under the control of the fields of the higher coercive force tapes. If these fields are in a direction opposite to those of the lower coercive force tapes, the latter tapes will be restored to their original information-bearing states. The readout is thus advantageously nondestructive. Information in the illustrative storage cell may be electrically changed in the manner briefly described in the foregoing in connection with the write operation.

It is a feature of this invention that the information storage cell outlined in the foregoing comprises the basic information address for a word-organized coordinate array ternary memory. In a specific arrangement according to this invention, the conductors of a plurality of wire memory elements lie along columns of the memory array and a plurality of solenoids lie along the rows of the array to define at their crosspoints a coordinate array of ternary information storage addresses. Such an organization of storage address is well known in the art and to this extent follows conventional practice in coordinate memories. In view of the detailed consideration of the memory, and its access circuitry which follows hereinafter, it will suffice at this point to note that the solenoids which define the word rows in the memory may be coupled to respective toroidal cores of a coordinate biased core switch. This switch and other access circuitry will also be discussed in greater detail hereinafter.

Figure 4:
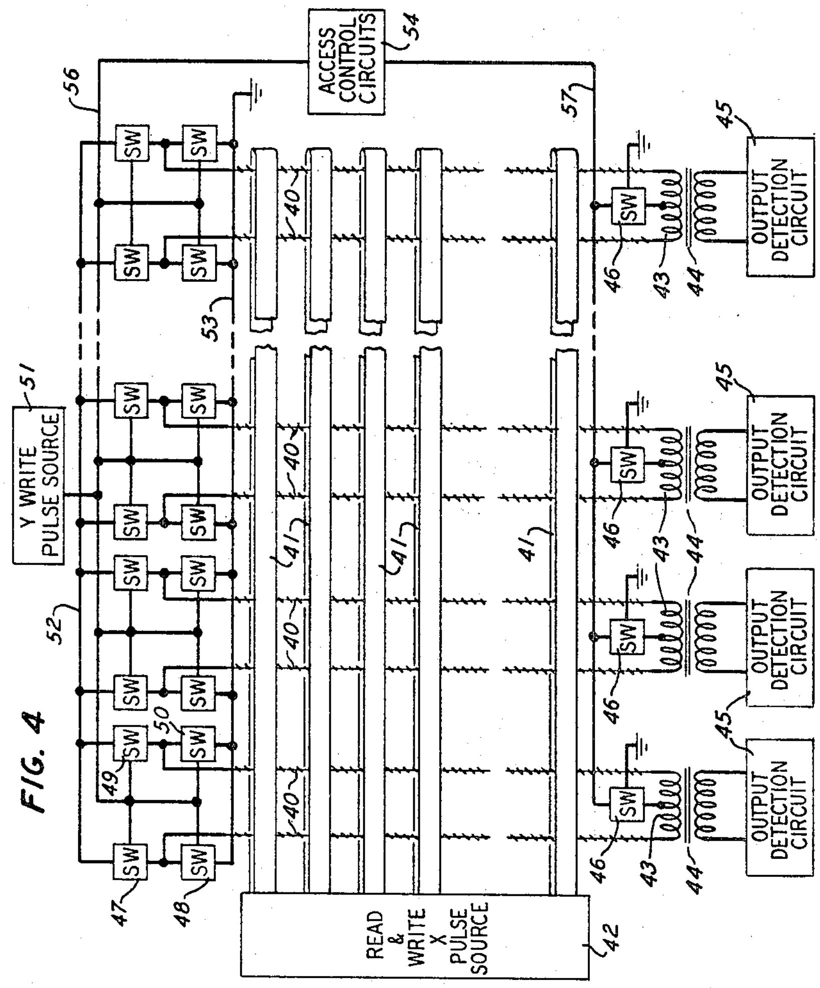
Figure 2:
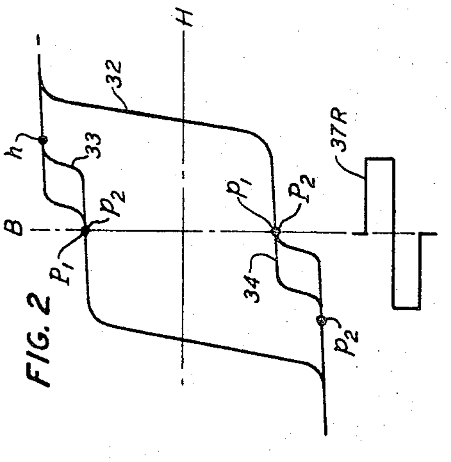
Figure 3:
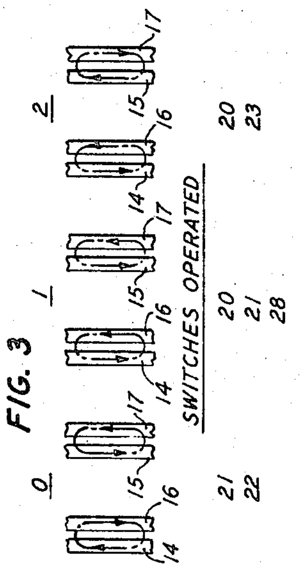

The objects and features of this invention will be better understood from a consideration of the detailed descriptions of illustrative embodiments thereof which follow when taken in conjunction with the accompanying drawing in which FIG. 1 depicts in simplified schematic form a single ternary memory address circuit in accordance with this invention;

FIG. 2 depicts a composite hysteresis characteristic curve of either one of the wire memory elements of the pair making up a single ternary memory address circuit of this invention;

FIG. 3 indicates the particular magnetization states of the memory elements of this invention which represent the ternary numbers and the controls selected for their introduction into the address circuit of FIG. 1;

FIG. 4 is a simplified schematic drawing of a single-plane coordinate array memory employing ternary individual storage addresses according to the principles of this invention; and FIG. 5 shows a portion of the circuit of FIG. 1 including an alternate means for associating the wire memory elements.

Before proceeding to a detailed description of an illustrative ternary storage circuit in accordance with this invention the ternary number system and its arithmetic will be reviewed. A number in any number system can be written in the form $$N=A_{-m}R^{-m}+A_{1-m}R^{1-m}+\ldots+A_{-1}R^{-1}+A_0R^0+A_1R^1+\ldots+A_{n-1}R^{n-1}+A_nR^n \quad (5)$$

where N is the number, A is the system symbol, R is the system radix, and $m$ and $n$ are integers. For the ternary number system in which the radix R is three, the system symbols are zero (0), one (1), and two (2). In the decimal system, for example, the number 59.247 can be expressed as follows:

$$59.247=(2)3^{-4}+(0)3^{-3}+(2)3^{-2}(0)3^{-1}+(2)3^0+(1)3^1+(0)3^2+(2)3^3 \quad (6)$$
$$=\tfrac{2}{81}+\tfrac{2}{9}+2+3+2(27)$$

In the normal case a number is written in terms of the system symbols with the radix understood. The $n$th symbol is written first, the $n$-1 symbol is written second, etc., thus $$N=A_nA_{n-1}\ldots A_1A_0A_{-1}\ldots A_{1-m}A_{-m} \quad (7)$$

In the ternary number system the number 59.247 is written as 2012.020 . . .

It may be noted that each of the characters of this number is one of the coefficient of the radix terms in Equation 6 above.

A number in any number system can be converted to a number in any other number system by calculating the coefficients of the radix terms. However, the method of calculating for the terms to the left of the decimal point is different from the calculation for the terms to the right of the point. In the former case, the method is to divide the terms of the number to be converted that are to the left of the decimal point by the radix of the new number system and note the remainder. The quotient is then divided by the radix and the remainder is again noted. The divisions are carried out in the arithmetic of the number system to which the number being converted belongs. This division procedure is continued until the dividend is less than the divisor (the radix of the new number system) and the dividend becomes the remainder. The remainder from each division represents the system symbols $A_0$, $A_1$, . . ., $A_{n-1}$, $A_n$, respectively. In equation form this becomes $$\frac{N}{R}=N'+\frac{A_0}{R};\ \frac{N'}{R}=N''+\frac{A_1}{R};\ \frac{N''}{R}=N'''+\frac{A_2}{R};\ \text{etc.} \quad (8)$$

An exemplary conversion from the decimal to the ternary system in which the decimal number is given $N=59$ is demonstrated as follows:

$$\tfrac{59}{3}=19+\tfrac{2}{3} \text{ and } A_0=2$$
$$\tfrac{19}{3}=6+\tfrac{1}{3} \text{ and } A_1=1$$
$$\tfrac{6}{3}=2+\tfrac{0}{3} \text{ and } A_2=0$$
$$\tfrac{2}{3}=0+\tfrac{2}{3} \text{ and } A_3=2$$

The ternary form of the decimal number 59 is thus 2012.

To calculate the terms to the right of the decimal point, the terms of the number to be converted which are to the right of the decimal point are multiplied by the radix of the new number system. The desired coefficient then is the number to the left of the decimal point in the product. The numbers to the right of the decimal point in the latter product are then multiplied by the radix of the new number system and the number to the left of the decimal point in the new product is again noted. These multiplications are performed in the arithmetic of the number system to which the number being converted belongs. The multiplications are continued until either the numbers to the right of the decimal point in the product are all zeros or the number of decimal places desired in the converted number is attained. The whole number part of each product represents the system symbols $A_{-1}$, $A_{-2}$, . . ., $A_{1-m}$, $A_{-m}$, respectively. In equation form this becomes $$NR=A_{-1}+N';\ N'R=A_{-2}+N'';\ N''R=A_{-3}+N''';\ \text{etc.} \quad (9)$$

In accordance with this equation, an exemplary conversion from the decimal to the ternary system in which the decimal number is given $N=0.247$ is demonstrated as follows:

$$3(0.247)=0+0.741 \text{ and } A_{-1}=0$$
$$3(0.741)=2+0.223 \text{ and } A_{-2}=2$$
$$3(0.223)=0+0.669 \text{ and } A_{-3}=0$$
$$3(0.669)=2+0.007 \text{ and } A_{-4}=2$$

The ternary form of the decimal number 0.247 is thus 0202 and finally the ternary form of the decimal number 59.247 is 2012.0202 . . . .

Present day computers universally employ the binary system of numbering as a base of operation and it is highly likely that such a computer will in the future be called upon to operate in association with a computer based on the ternary system of numbering. It is thus of interest to consider the conversion of binary numbers to ternary numbers. In this connection Equations 8 and 9 are valid. It should again be noted that all operations must be carried out in the number system being converted to another. Further, since the binary number has a lower radix than the ternary system, the binary number 10 may appear as a remainder or in the product and this number must be read as the ternary symbol "2." This presents no problem because the ternary symbol "2" is not a symbol in the binary system. As an example of a binary to ternary conversion, the binary number 111011 is converted to its ternary equivalent as follows:

$$\frac{N}{3}=\frac{111011}{11}=10011 \text{ with a remainder 10, and } A_0=2$$

$$\frac{N'}{3}=\frac{10011}{11}=110 \text{ with a remainder 1, and } A_1=1$$

$$\frac{N''}{3}=\frac{110}{11}=10 \text{ with a remainder 0, and } A_2=0$$

$$\frac{N'''}{3}=\frac{10}{11}=0 \text{ with a remainder 10, and } A_3=2$$

The binary number 111011 thus corresponds to the ternary number 2012 which is also the decimal number 59. In converting from the ternary number system to the binary system, the division operation is performed in the ternary system and the remainders represent the binary symbols directly since all the binary symbols are also ternary symbols.

The following table lists the decimal numbers with their binary and ternary equivalent numbers:

| Decimal | Binary | Ternary |
|---|---|---|
| 0 | 0000 | 000 |
| 1 | 0001 | 001 |
| 2 | 0010 | 002 |
| 3 | 0011 | 010 |
| 4 | 0100 | 011 |
| 5 | 0101 | 012 |
| 6 | 0110 | 020 |
| 7 | 0111 | 021 |
| 8 | 1000 | 022 |
| 9 | 1001 | 100 |
| 10 | 1010 | 101 |

Mathematical operations performed on ternary numbers are similar to those operations performed on decimal numbers. In decimal system addition, a carry to the next higher order of ten is necessary when the sum of the augend and the addend is greater than mine. In ternary number system addition, a carry to the next higher order of three is necessary when the sum of the augend and addend is greater than two. The following table gives the basic rules of ternary addition:

| | 0 | 1 | 2 |
|---|---|---|---|
| 0 | 0 | 1 | 2 |
| 1 | 1 | 2 | 10 |
| 2 | 2 | 10 | 11 |

Subtracting in any number system requires that a digit be borrowed from the next higher order of the minuend if the present order of minuend is less than the subtrahend. The following table gives the basic rules of ternary subtraction:

| | Minuend | | |
|---|---|---|---|
| Subtrahend | 10 | 11 | 12 |
| 0 | 10 | 11 | 12 |
| 1 | 2 | 10 | 11 |
| 2 | 1 | 2 | 10 |

Multiplication of two numbers is performed by adding the multiplicand to itself as many times as the multiplier designates. A table showing all of the primary ternary multiplications follows:

| | 0 | 1 | 2 |
|---|---|---|---|
| 0 | 0 | 0 | 0 |
| 1 | 0 | 1 | 2 |
| 2 | 0 | 2 | 11 |

Multiplication of ternary numbers larger than those listed in the immediately foregoing table follows the same procedure followed in multiplying two large decimal numbers together. The multiplicand is multipled separately by each number in the multiplier and all of the partial products are added together.

Division of ternary numbers follows the same procedure employed in the division of decimal numbers. In ternary division, the rules of ternary addition and subtraction must be followed. This may be illustrated in the following example:

```
     111
10 ) 1110
     10
     —
      11
      10
      —
       10
       10
       —
```

The multiplication of ternary numbers involves the rules of addition and the division of ternary numbers involves the rules of addition and subtraction.

With the foregoing review of the ternary numbering system and its arithmetic in mind, we may now turn to the detailed consideration of one illustrative ternary information storage circuit as depicted in FIG. 1. This circuit comprises a pair of magnetic wire memory elements 10 and 11 comprising in turn, respectively, a pair of electrical conductors 12 and 13 having helically wound thereon first magnetic tapes 14 and 15. Each of the tapes 14 and 15 has a second magnetic tape 16 and 17 helically wound thereupon. The first and second tapes are of a material exhibiting substantially rectangular hysteresis characteristics; however, the tapes 14 and 15 each have a coercive force which is higher than the coercive force of each of the tapes 16 and 17. The latter tapes are shown in the drawing as somewhat narrower than the tapes 14 and 15 to symbolize this difference in coercive forces although it is to be understood that in practice they may have the same widths. Individual wire memory elements of this character are well known in the literature where they have been familiarly termed "piggy-back twistors."

In a conventional manner, an information address is defined on the two elements 10 and 11 by a flat strip solenoid 18 inductively coupled to the first and second tapes of each of the elements. The electrically conducting solenoid 18 is arranged to encircle the elements 10 and 11 to achieve its coupling in both directions. A single storage cell according to the principles of this invention thus includes the two sections of the solenoid 18 and segments defined thereby on the first and second tapes of the elements 10 and 11. The conductors 12 and 13 are connected at one end to a Y pulse source 19 through a pair of switches 20 and 21, respectively. The conductors 12 and 13 are also connected at the one end to ground through a second pair of switches 22 and 23, respectively. At their other ends the conductors 12 and 13 are connected together through a center-tapped winding 24 of a transformer 25. The secondary winding 26 of the transformer 25 is connected to output detection circuits 27 and the center-tap of the winding 24 is connected to ground through a switch 28. The solenoid 18 has connected thereto at one end an X pulse source 29 and its other end is connected to ground. The external circuit components of the illustrative ternary information storage cell of FIG. 1 are of a character well known in the art and are accordingly depicted in block symbol form only. These circuits will be described only in terms of the functions that each performs and these functions will readily bring to mind various available means for performing them to one skilled in the art.

The organization of a specific storage cell according to the principles of this invention as described in the foregoing makes possible novel ternary memory operation which may now be considered. It will be appreciated that although the information storage circuit of FIG. 1 is advantageously adapted as a storage cell for a single ternary number, it may also be employed as the basic storage cell for a coordinate storage matrix as will be considered hereinafter. In the latter case a number of solenoids are coupled to the magnetic wire memory elements. The relationship of other solenoids with the elements of the circuit depicted in FIG. 1 is demonstrated by the broken-line outlines 30 and 31 of such solenoids in the figure. It will be recalled that individual storage cell segments are defined by a solenoid 18 on the magnetic tapes wound on the conductors 10 and 11. The solenoids are separated by a small distance along the wire memory elements, the portions between the storage segments being termed buffer regions of the magnetic tapes. These regions are suitably dimensioned taking into account the dimensions of the other elements and the particular characteristics of the magnetic materials employed to isolate magnetizations established in the storage segments of the tapes.

Although a number of magnetization patterns are available in accordance with the principles of this invention to represent information stored, the pattern selected to describe an illustrative operation of this invention is one in which the buffer regions of the magnetic tapes between adjacent solenoids are unmagnetized. If the circuit of FIG. 1 were operated as a single number storage cell the regions adjacent the storage segments of the tapes would be of no concern. However, in order to understand the operation of the storage circuit of FIG. 1 in any context, a preliminary operation will be assumed in which each of the tapes 14, 15, 16, and 17 is demagnetized preparatory to the establishing of information-representative magnetic states therein. Demagnetization of the magnetic tapes of the elements 10 and 11 may be accomplished by applying a damped sinusoidal current to the conductors 12 and 13 and it is to be understood that this operation has been completed either during the construction of the storage circuit or immediately prior to its first write operation.

Ternary information is stored in the storage circuit of FIG. 1 in the form of representative remanent magnetic states induced in segments of the tapes 14 and 15 defined by the solenoid 18. In the manner described in the patent of Barrett referred to hereinbefore, demagnetizing fields generated by a primary magnetization in a high coercive force tape 14 or 15 segment will establish secondary magnetizations in the opposite direction in the same segments of the low coercive force tapes 16 or 17, respectively. This is demonstrated in FIG. 2 which depicts a composite hysteresis loop of a combined high and low coercive force tape of either of the conductors 12 or 13. The remanent points $P_1$ and $P_2$ appear on the curve 32 which is the characteristic loop of the high coercive force tapes 14 and 15. The points $P_1$ and $P_2$ also appear on opposite saturation areas of the curves 33 and 34, which represent two positions of the characteristic loop of the low coercive force tapes 16 and 17 superimposed on the curve 32 of the high coercive force tapes, and on which curves 33 and 34 the points $P_1$ and $P_2$ appear as the corresponding points $p_2$ and $p_1$ respectively. It is thus evident from FIG. 2 that when a segment of the magnetic tape 14 or 15 is in the remanent state at point $P_1$, the associated segment of either tape 16 or 17 is in the opposite state of magnetic saturation, with the opposite holding true when the high coercive force tape is at the remanent point $P_2$. The ternary information-representative magnetic states of the magnetic tapes of the memory elements 10 and 11 of the circuit of FIG. 1 are indicated in FIG. 3 which symbolizes broken segment portions of these tapes in longitudinal view. The tape segments are shown slightly separated for the sake of clarity and their actual helical disposition of the conductors 12 and 13 is disregarded for this purpose.

As shown in FIG. 3, a ternary "0" is represented by a primary magnetic state in the address segment of the tape 14 represented by the point $P_1$ on the curve 32. A demagnetizing field, as a result, induces a secondary magnetization in the associated address segment of the tape 16 in the opposite direction represented on the curve 33 by the point $p_2$. A magnetic representation of a ternary "0" in the address segment of the circuit of FIG. 1 also includes a primary remanent magnetization in the high coercive force tape 15 of the element 11. This primary magnetization is in the opposite direction from that in the segment of the tape 14 and is indicated in FIG. 2 as the point $P_2$ on the curve 32. A demagnetizing field again induces a secondary magnetization in the tape 17 indicated in FIG. 2 as the point $p_1$ on the curve 32. FIG. 3 shows by means of arrows these oppositely directed magnetizations in the tapes 14–16 and 15–17 representative of a ternary "0."

A ternary "1" is represented in the two memory elements 10 and 11 by magnetizations in the tapes 14 and 15 which are in the same direction and at the point $P_2$ on the curve 32. The oppositely induced magnetizations in the segments of the tapes 16 and 17 will also be in the same direction. Finally, a ternary "2" is represented in the elements 10 and 11 by oppositely directed magnetizations in the address segments of the tapes 14 and 15 which are also opposite to the respective magnetizations in the same tape segments which represent a ternary "0." These primary magnetizations and their induced secondary magnetizations are also represented in FIG. 3 by arrows in the broken tape segments. With the polarities of the information-representative magnetic states of the tape segments of the elements 10 and 11 thus established, the specific manner in which these magnetizations may be achieved during a write operation may now be considered.

A write operation in the storage circuit of FIG. 1 is accomplished on a coincident current basis, that is, both the soneloid 18 and conductors 12 and 13 are energized to introduce the required magnetizations into the storage cell. The excitation applied to any one of these elements is of insufficient magnitude to cause a permanent flux change in the address segments of the storage tapes. The two excitations, which may be termed "half-select," together are sufficient, where the previous magnetic state permits, to cause a flux switching in the storage tape segments. Coincident current selection of an information address from among a plurality of coordinately organized addresses is well known in the art and, although in the case of a single address this technique is unnecessary, this manner of excitation is described in connection with the embodiment of this invention depicted in FIG. 1 in view of its contemplated incorporation in a complete memory matrix to be described hereinafter.

In order to introduce the proper information-representative magnetic states in the segments of the tapes 14 and 15, bipolar pulses 35W are applied to the solenoid 18 by the X pulse source 29. In practice, the source 29 may advantageously comprise a toroidal core of a core access switch to which core the solenoid 18 may be coupled. The core would then generate a bipolar pulse as it is set and reset by its access control currents. Coincidently with the pulse 35W applied to the solenoid 18, the Y pulse source 19 is controlled to apply a positive write pulse 36W to one or the other or both, of the conductors 12 and 13 of the memory elements 10 and 11, respectively. The pulse 36W is of sufficient duration to overlap both alternations of the write pulse 35W and the field vectors generated by these pulses operate on the segments of the tapes 14 and 15 defined by the solenoid 18. The directions of the field vectors and hence the directions of the magnetizations induced in the tape segments are determined by which of the conductors 12 and 13 has the pulse 36W applied thereto and this, in turn, is controlled by the selective operation of the switches 20 through 23 and 28.

A ternary "0" is written into the circuit of FIG. 1 by operating the switches 21 and 22 to close an energization path from the source 19 to ground via the switch 21, conductor 13, primary winding 24, conductor 12, and the switch 22. Upon the application of the coincident pulses 35W and 36W and during the initial positive alternation of the pulse 35W, the field vector sums operating on the segments of the tapes 14 and 15 are as follows: In the tape 14 the vector sum is operative at right angles to the longitudinal axis of the tape and in the tape 15 the vector sum is operative in a generally downward direction along the longitudinal axis of the tape as viewed in the drawing. As a result, in the tape 14, since the drive is at right angles to the preferred direction of magnetization, the magnetic state is not premanently affected. In the tape 15, on the other hand, the drive is along the preferred direction of magntization and accordingly a remanent flux is induced in the generally downward direction along the tape 15. This corresponds with the representative magnetic state of the tape 15 symbolized in FIG. 3, for the ternary number "0." During the subsequent negative alternation of the pulse 35W, the vector sums of the fields are reversed, the drive now being along the preferred direction of magntization of the tape 14 leaving the tape 15 undisturbed. A remanent flux in the generally upward direction is left in the address segment of the tape 14 which also corresponds with the magnetic state indicated for the number "0" represented in FIG. 3.

The field vector sums during the two alternations of the pulse 35W are operative on the address segments of the tapes 14 and 15 for the other two ternary numbers in a manner identical to that described for the number "0" with the directions of the vector sums determining the polarity of the remanent magnetizations induced in the segments of the tapes 14 and 15. These directions, it will be recalled, are controlled by the selective operation of the switches 20 through 23 and 28. As already noted and as indicated in FIG. 3, the switches 21 and 22 are operated to write in the circuit a ternary "0." In a similar manner, the switches 20 and 23 are operated to prepare an energization path through the conductors 12 and 13 in the opposite directions for the writing of a ternary "2." In the case of a ternary "1," the magnetizations in the segments of the tapes 14 and 15 will be in the same direction as indicated in FIG. 3. The current pulse 36W must accordingly be applied to both of the conductors 12 and 13 in the same direction. Such a parallel connection with the source 19 of the conductors 12 and 13 is made possible by the operation of the switches 20, 21, and 28. Parallel paths are thus traced from the source 19 to ground via the switches 20 and 21, conductors 12 and 13, the center-tap of the primary winding 24, and the switch 28.

The primary magnetizations thus induced in the tapes 14 and 15 representative of the ternary numbers, generate demagnetizing fields which in turn induce secondary magnetizations in the associated segments of the low coercive force tapes 16 annd 17 as previously explained. With the magnetizations thus induced during an exemplary write operation, the information thus stored may now be read out without disturbing its permanent storage in the circuit. Information is changed in a manner identical to that described in the immediately foregoing for an initial write operation. The sources 19 and 29 and the appropriate switches 20 through 23 and 28 are controlled to write in the new information. A read operation is accomplished by energizing the solenoid 18 alone. However, the source 29 is now controlled to apply a bipolar read current pulse 37R to the solenoid 18 which is of less amplitude than the write current pulse 35W previously applied. Assuming that the source 29 is a core of a core access switch as earlier suggested, then the core itself would be energized with a total current of shorter duration to reduce the output signals generated in the coupled solenoid 18. The magnitude of the pulse 37R is adjusted so that, although it is of sufficient amplitude to switch flux in a segment of the low coercive force tapes 16 and 17, it is insufficient to switch the flux in the high coercive force tapes 14 and 15.

As is known in the case of magnetic wire memory elements, a flux switching in the magnetic tape wound about the memory element conductor induces a voltage signal in the conductor as an output of the circuit. In the present case, the outputs of the circuit appear across the primary winding 24 of the transformer 25. A circuit is prepared for the output signals generated during a readout operation through the two conductors 12 and 13 by operating the switches 20 and 21 at this time, assuming the latter switches to be of the character which merely open and close circuit paths as for example, relay contacts. As the pulse 37R is applied to the solenoid 18, the flux switching, if any, caused in the low coercive force tapes 16 and 17 induce in this completed circuit, voltage signals which are algebraically added during both alternations of the read pulse 37R on the solenoid. The specific output signals representative of the ternary numbers which may appear in the secondary winding 26 of the transformer 25 during a readout operation may be determined from the various available flux states of the elements of the circuit of FIG. 1 which are symbolized in FIGS. 2 and 3. Thus, for example, assuming that a ternary "0" is stored in the address segments of the storage tapes 14 and 15, the segment of the tape 14 may then be considered to reside at the point $P_1$ of the curve 32 and the tape 15 at the point $P_2$. The segment of the low coercive force tape 16 would then reside at the point $p_2$ of the curve 33 and the tape 17 would be at the point $p_1$ of the curve 34. During the positive alternation of the pulse 37R, the segment of the tape 16 would be switched whereas the segment of the tape 17 would merely be driven further into saturation, or "shuttled." During the negative alternation of the pulse 37R, the segment of the tape 16, previously switched, is restored to its original magnetic state and the segment of the tape 17 is now switched. As may be seen from FIG. 2, in the case of each alternation of the pulse 37R, the magnetic states of the storage tapes 14 and 15 are merely shuttled for the read drive is insufficient to cause a flux excursion beyond the knees of the loop 32.

Since the conductors 12 and 13 are connected in series with the primary winding 24 during readout, the voltage signals generated therein by the oppositely switching segments of the tapes 16 and 17 are of the same polarity in the winding 24 and the signals generated during either alternation of the pulse 37R may be utilized as the information-bearing output signal. The output signals may be selectively strobed in the output detection circuit 27 by means well known in the art. The output signals in the primary winding 24 of the transformer 25 during the reading of a ternary "2" are generated in a manner identical to that described for the readout of a ternary "0." However, in this case, the output signals are of the opposite polarity as will be understood from the oppositely directed flux switchings which take place as a result of the read current pulse 37R. Where the readout operation detects the storage of a ternary "1," that is, the number for which the magnetizations in the storage tapes 14 and 15 are in the same direction with respect to the solenoid 18, the flux switchings will also be in the same direction responsive to the read pulse 37R. The voltage signals generated in the conductors 12 and 13, as a result, cancel in the primary winding 24 and effectively a zero signal is transmitted to the output detection circuit 27 as indicative of the storage in the address segments of the tapes 14 and 15 of the ternary "1."

It will be recalled that during the negative alternation of the read pulse 37R, one of the low coercive force tape segments of the elements 10 and 11 is reset to its original secondary magnetic state. In accordance with the nondestructive readout aspect of this invention, the segment of the low coercive force tape which was switched in either memory element by the negative alternation of the pulse 37R is automatically reset by the demagnetizing fields of the buffer regions adjacent the address segment of a storage, high coercive force tape 14 or 15. At the termination of the read pulse 37R, the switches 20 and 21 are controlled to reopen the circuit connecting the conductors 12 and 13 in series and the circuit is prepared for another access operation.

In FIG. 4 is shown an XY coordinate array organization of a ternary memory according to this invention in which individual storage addresses of the character depicted in FIG. 1 are arranged in rows and columns. A plurality of pairs of magnetic wire memory elements 40 are parallelly arranged in columns and have defined thereon along their lengths the individual storage addresses by a transverse plurality of parallel solenoids 41. The wire elements 40 are identical in character to the elements 10 and 11 of the single address circuit of FIG. 1 and thus have two magnetic tapes of different coercive forces wound thereabout for their entire lengths. Each storage address at the cross-points of the wire elements 40 and solenoids 41 thus comprises a pair of segments of the tapes of the elements 40 inductively coupled to the solenoids 41. The solenoids 41 encircle the elements 40 to provide inductive coupling in both directions and the solenoids 41 are connected in a circuit including an X source of read and write pulses 42. The latter source provides bipolar pulses for both the write and read operation of a magnitude and character described in connection with the embodiment of this invention shown in FIG. 1. In practice the array of FIG. 4 may advantageously comprise a single plane of a three-dimensional memory in which case the source 42 may comprise a biased magnetic core coordinate access switch of the character already suggested in the foregoing.

The wire memory element pairs 40 are organized at each end in a manner identical to that described for the single address circuit of FIG. 1. Thus, each of the pairs is connected together at one end through a center-tapped primary winding 43 of a transformer 44. The secondary winding of the transformer 44 in each case is connected to an output detection circuit 45. The latter circuits may include, or may connect to, ternary register circuits for receiving ternary information-representative signals during a readout operation. The center-tap of each of the windings 43 is connected to ground through a switch 46. In its simplest form a switch 46 may comprise a relay contact for opening and closing a circuit path.

At the other ends, the memory elements 40 are connected to groups of switches, each being of the character described in connection with the switches 46 at the opposite ends of the memory elements. The switches of the other ends of the first memory elements 40 shown in FIG. 4, for example, comprises the switches 47 through 50. The switches 47 and 49, and their corresponding switches of each of the columns of the array control circuit paths from a Y source of write pulses 51 via a common conductor 52 to the individual elements of the wire memory element pairs 40. The switches 48 and 50, and their corresponding switches of the other columns of the array are each connected at one end to a common ground conductor 53 and selectively control a path from ground to each of the elements of the wire memory element pairs 40. The various switches so far referred to are controlled to perform their circuit opening and closing functions by access control circuits 54 via a control cable 56 for the switches 47 through 50 and via a control cable 57 for the switches 46. The access control circuits 54 may comprise any circuitry of the system of which the present invention may advantageously be adapted for use and specific means for performing their control functions will be readily envisioned by one skilled in the art. Since the specific character of these circuits do not comprise a part of this invention they are shown in block symbol form only, as are the other circuits for performing an access operation. Since all of these circuits may take a variety of forms, each well known in the art, their details need not be further considered for a complete understanding of this invention.

The foregoing organization of one specific array embodiment of a ternary memory according to this invention makes possible selective read and write operations identical to those already considered in detail in connection with the embodiment of FIG. 1. The memory of FIG. 4 is word-organized with the result that during a read operation, a bipolar pulse, such as the pulse 37R applied to a solenoid in the circuit of FIG. 1, is applied to each of the storage addresses defined along a selectively energized solenoid 41. During a read operation, no pulses are applied from the source 51; however, the switches 47 and 49 of each column are controlled by the control circuits 54 to achieve a direct connection at that end between each of the elements of each of the wire memory element pairs 40. The switches 46 are controlled by the same control circuits 54 to maintain an open circuit for each column between the center-taps of the windings 43 and ground during readout. The signals generated in the low coercive force tapes of the elements 40 as determined by the directions of flux established therein in accordance with the stored information are transmitted to the output detection circuits 45 via the transformer 44. Their character and the nondestructive nature of the readout have already been considered in connection with the single address embodiment of FIG. 1.

During a write operation, solenoids 41 are selectively energized from the source 42 to apply to individual solenoids write pulses of the character applied to a solenoid of the circuit of FIG. 1. These bipolar pulses 35W are themselves of insufficient magnitude to cause a flux switching in the address segments of the magnetic tapes in which the information is to be stored. The pulses 35W are augmented by write pulses from the write pulse source 51 such as the pulse 36W depicted in FIG. 1. The pulse 36W is applied in parallel via the common conductor 52 to each of the wire element pairs 40. However, the particular directions in which the current traverses each element is determined by the ternary numbers to be stored in the individual storage addresses and these directions of the current are in turn controlled by the switch sets 47 through 50. Selection within the word rows among the individual storage addresses is thus achieved in conventional fashion on a coincident current basis, neither of the coincident currents being by itself sufficient to disturb existing flux states in the segments of the higher coercive force tapes wound on the element pairs 40.

In the foregoing descriptions of the operations of the embodiments of this invention depicted in FIGS. 1 and 4, it was assumed, as already mentioned, that the external control switches, such as the switches 20 through 23 and 28 of FIG. 1, for example, comprise simple devices such as relay contacts which merely control the continuity of a circuit path. It is to be understood that the assumption of such relay contacts is by way of example only. In the practice of this invention, in order to take advantage of the fast switching time of the magnetic wire memory elements contemplated, transistor switches may be employed to control the circuit paths of the memory elements. In such a case, however, the necessary continuity would not be achieved, for example, during readout in the case of the switches 20 and 21 of the embodiment of FIG. 1. An alternate circuit arrangement may be employed as depicted in FIG. 5. Only a portion of the circuit of FIG. 1 is there shown to include as an additional circuit element a resistor 60 connected across the ends of the memory elements 10 and 11. Thus, if the switches 20 and 21, for example, are envisioned as transistor devices, the presence of the resistor 60 renders the circuit operable without the operation of the switches 20 and 21 during readout. If the value of the resistor 60 is chosen at 500 to 700 ohms, the write operation of the embodiments of FIGS. 1 and 4 is not effected when known magnetic wire memory elements are employed.

What have been described are considered to be only illustrative embodiments of this invention, and it is to be understood that various and numerous other arrangements thereof may be devised by one skilled in the art without departing from the spirit and scope of this invention as defined by the accompanying claims.

What is claimed is:

1. A memory circuit comprising a first and a second electrical conductor, each of said conductors having a first and a second magnetic tape helically wound thereon, each of said tapes being of a material having substantially rectangular hysteresis characteristics, said first tape having a greater coercive force than said second tape, a third electrical conductor inductively coupled to segments of said first and second tapes of each of said first and second electrical conductors and defining a ternary information storage cell to include said segments, means for establishing magnetic states in said segments of said first tapes of said cell representative of ternary numbers comprising means for applying a first current pulse to said third electrical conductor, a first and a second means for applying second and third current pulses of opposite polarity, respectively, to said first and second conductors in series coincidently with said first current pulse, and means for applying simultaneous third current pulses of the same polarity to said first and second conductors in parallel coincidently with said first current pulse; means for subsequently applying a readout pulse to said third conductor, and means for detecting voltage signals generated in said first and second conductors responsive to flux changes in said second tapes.

2. A ternary memory circuit comprising a first and a second parallelly arranged electrical conductor, a first and a second magnetic tape helically wound around said first and second conductors, respectively, each of said tapes having substantially rectangular hysteresis characteristics, a third electrical conductor inductively coupled to segments of said first and second magnetic tape and defining an information storage address thereon, and write means for establishing particular remanent magnetic states in said segments of said first and second tapes representative of particular ternary information characters comprising means for connecting said first and second electrical conductors in a series circuit, means for connecting said first and second electrical conductors in a parallel circuit, a first pulse source for applying a first write pulse to said third electrical conductor, a second pulse source for generating a second write pulse coincidently with said first write pulse, means for connecting said second pulse source to one of said first and second conductors when said last-mentioned conductors are connected in series for one of said ternary characters, means for connecting said second pulse source to the other of said first and second conductors when said last-mentioned conductors are connected in series for another of said ternary characters, and means for connecting said second pulse source to both of said first and second conductors when said last-mentioned conductors are connected in parallel for a last of said ternary characters.

3. A ternary memory circuit according to claim 2 also comprising a third and fourth magnetic tape helically wound around said first and second conductors, respectively, each of said third and fourth tapes having a coercive force less than said first and second tapes, said third and fourth tapes being arranged with respect to said first and second tapes so that magnetizations in said segments of said last-mentioned tapes establish secondary magnetizations in segments of said third and fourth tapes.

4. A ternary memory circuit according to claim 3 also comprising readout means comprising means for applying a read current pulse to said third conductor of sufficient magnitude only to switch magnetizations in said segments of said third and fourth magnetic tapes and output means for detecting signals generated in said first and second conductors responsive to the switching of magnetizations in said last-mentioned segments.

5. A ternary memory circuit according to claim 4 in which said output means comprises a transformer primary winding connected in series circuit and in which said means for connecting said first and second electrical conductors in a parallel circuit includes a center-tap on said primary winding.

6. A ternary memory circuit comprising a pair of electrical conductors each having a first and a second magnetic tape helically wound therearound, said first tape having substantially rectangular hysteresis characteristics and having a coercive force greater than said second tape, a solenoid inductively coupled to each of the magnetic tapes of said pair of conductors and defining an information storage address on segments of said tapes, write means comprising a first energizing circuit including a first pulse source for applying a first half-select current to said solenoid, second energizing circuit means including a second pulse source for applying a second half-select current to said pair of conductors comprising first switching means for connecting said pair of conductors in series and for connecting said second pulse source to one of said pair of conductors, second switching means for connecting said pair of conductors in series and for connecting said second pulse source to the other of said pair of conductors, and third switching means for connecting said pair of conductors in parallel and for connecting said second pulse source to the parallel connection of said pair of conductors.

7. A ternary memory circuit according to claim 6 also comprising transformer means having a primary winding connecting one end of said pair of conductors and in which said third switching means includes means for completing said parallel connection of said pair of conductors through a center-tap of said primary winding.

8. A ternary memory circuit according to claim 7 also comprising readout means comprising means for applying a read current to said solenoid of a magnitude less than the sum of the magnitudes of said first and second half-select currents and means including a secondary winding on said transformer for detecting sum output voltage generated across said pair of conductors.

9. A ternary memory circuit comprising first and second magnetic storage means each having substantially rectangular hysteresis characteristics, a first and second electrical conductor individually coupled to said first and second storage means, respectively, a third electrical conductor coupled to both said first and second storage means, write means comprising a first write circuit including said third electrical conductor and a first write pulse source, a plurality of second write circuits each including a common second write pulse source, a first write circuit including said first and second conductors in series and switching means for connecting said second write pulse source in said first write circuit to produce currents in opposite directions with respect to said third conductor in said first and second conductors, a second write circuit also including said first and second conductors in series and switching means for connecting said second write pulse source in said second write circuit so as to reverse said currents in said first and second conductors, and a third write circuit including a parallel connection of said first and second conductors and switching means for connecting said second write pulse source to said parallel connection to produce currents in the same direction in said first and second conductors with respect to said third conductor.

10. A ternary memory circuit according to claim 9 also comprising sensing means comprising third and fourth magnetic means also coupled to said first and second electrical conductors, respectively, said third and fourth magnetic means having a lower coercive force than said first and second magnetic storage means, said third and fourth magnetic means being arranged with respect to said first and second magnetic storage means so that magnetizations in said last-mentioned means induces secondary magnetizations in said third and fourth magnetic means, a read energizing circuit including said third electrical conductor and said first write pulse source, said last-mentioned source being controllable to apply a read current to said third electrical conductor of a magnitude sufficient to switch magnetizations in said third and fourth magnetic means but insfficient to affect permanent magnetizations in said first and second magnetic storage means, and output means for detecting signals generated in said first and second electrical conductors.

11. A ternary memory circuit according to claim 10 in which said output means comprises a transformer having a primary winding connected between one end of said first and second electrical conductors, said primary winding being common to each of said first, second, and third write circuits.

12. A ternary memory matrix arrangement comprising a plurality of pairs of magnetic wire memory elements, each of said wire memory elements comprising an electrical conductor having a first and a second magnetic tape helically wound therearound, said first tape having substantially rectangular hysteresis characteristics and having a higher coercive force than said second tape, a plurality of strip solenoids transversely arranged in inductive coupling with said pairs of wire memory elements and defining a coordinate array of information address segments on said first tapes, a first plurality of write circuits for said plurality of pairs of memory elements, respectively, each of said first plurality of write circuits comprising a common first write current source for providing a first half-select write current, switching means for selectively connecting the conductors of a pair of wire memory elements in series and in parallel, and switching means for selectively connecting said first write current source to either conductor of a pair of wire memory elements when such conductors are connected in series and for selectively connecting said first write current source to both of the conductors of a pair of wire memory elements when such conductors are connected in parallel, a second plurality of write circuits for said plurality of solenoids, respectively, each of said second plurality of write circuits comprising a second write current source selectively controllable to apply second half-select write currents to said solenoids.

13. A ternary memory circuit comprising a pair of wire memory elements, each comprising an electrical conductor having a storage magnetic tape and a sensing magnetic tape wound therearound, said storage magnetic tape having substantially rectangular hysteresis characteristics and a coercive force higher than the coercive force of said said sensing tape, means for establishing particular combinations of remanent magnetizations in segments of said storage magnetic tapes representative of ternary numbers comprising a third electrical conductor inductively coupled to said segments, means for applying a bipolar half-select write pulse to said third electrical conductor, means for applying first half-select write pulses of opposite polarity to the conductors of said pair of memory elements for one ternary number coincidently with said bipolar write pulse, means for applying second half-select write pulses of polarities opposite to the polarities of said first half-select pulses to said conductors of said pair of memory elements for another ternary number coincidently with said bipolar write pulse, and means for applying third half-select write pulses of the same polarity to the conductors of said pair of memory elements for a last ternary number coincidently with said bipolar write pulse, said remanent magnetizations in said segments of said storage tapes inducing secondary magnetizations in said sensing tapes.

14. A ternary memory circuit according to claim 13 also comprising means for sensing said combinations of remanent magnetizations comprising means for applying a read current pulse to said third electrical conductor of sufficient magnitude to switch magnetizations only in said sensing tapes, and means for detecting the sum signals generated in said first and second conductors responsive to switching of magnetizations in said sensing tapes indicative of said combinations of remanent magnetizations and said ternary numbers.

15. An electrical circuit for storing ternary information comprising a pair of memory elements each comprising an electrical conductor having magnetic tape helically wound therearound, said tape having substantially rectangular hysteresis characteristics, connecting means for connecting one end of said conductors together, a first write pulse source, means for selectively connecting said first write pulse source to the other ends of said first and second conductors, means for connecting said first write pulse source to the other end of said first and second conductors simultaneously, a solenoid inductively coupled to said tapes of said pair of wire memory elements, and a second write pulse source connected to said solenoid.

16. An electrical circuit as claimed in claim 15 also comprising readout means comprising a read pulse source connected to said solenoid and output means for detecting sum signals generated in the conductors of said pair of wire memory elements.

17. An electrical circuit as claimed in claim 16 in which said connecting means comprises a primary winding of a transformer and said output means is connected to a secondary winding of said transformer.

18. A memory circuit comprising a first and a second storage magnetic means, each having substantially rectangular hysteresis characteristics, a first and a second electrical conductor inductively coupled respectively to said first and second storage magnetic means in the same sense, a third electrical conductor inductively coupled to said first and second storage magnetic means in opposing senses, write means for establishing particular combinations of magnetization states in said first and second storage magnetic means comprising means for connecting said first and second electrical conductors in a series circuit including means for selectively causing a first write current in one and the opposite polarity therein, means for connecting said first and second electrical conductors in a parallel circuit including means for causing a first write current in the same direction in said first and second conductors, and means for applying a second write current to said third electrical conductor concidently with any one of said first write currents.

19. A memory circuit according to claim 18 also comprising readout means comprising a first and a second sensing magnetic means coupled respectively to said third electrical conductor in opposing senses, said first and second sensing magnetic means having a lower coercive force than the coercive force of said first and second storage magnetic means and being arranged with respect thereto so that the fields of magnetizations in said last-mentioned magnetic means induces secondary magnetizations in said first and second sensing magnetic means, means for applying a readout current pulse to said third electrical conductor of sufficient amplitude to cause a flux change in said sensing magnetic means but of insufficient amplitude to cause a permanent flux change in said storage magnetic means, and means for detecting summation voltage signals in said first and second electrical conductors.

References Cited

UNITED STATES PATENTS

| | | | |
|---|---|---|---|
| 3,056,948 | 10/1962 | Lee | 340—174 |
| 3,067,408 | 12/1962 | Barrett | 340—174 |
| 3,105,224 | 9/1963 | Williams | 340—174 X |
| 3,105,962 | 10/1963 | Bobeck | 340—174 |
| 3,210,741 | 10/1965 | Cohler et al. | 340—174 |
| 3,231,753 | 1/1966 | Brown | 340—174 X |
| 3,317,902 | 5/1967 | Michael | 340—174 X |

STANLEY M. URYNOWICZ, Jr., *Primary Examiner.*